Figure 1:
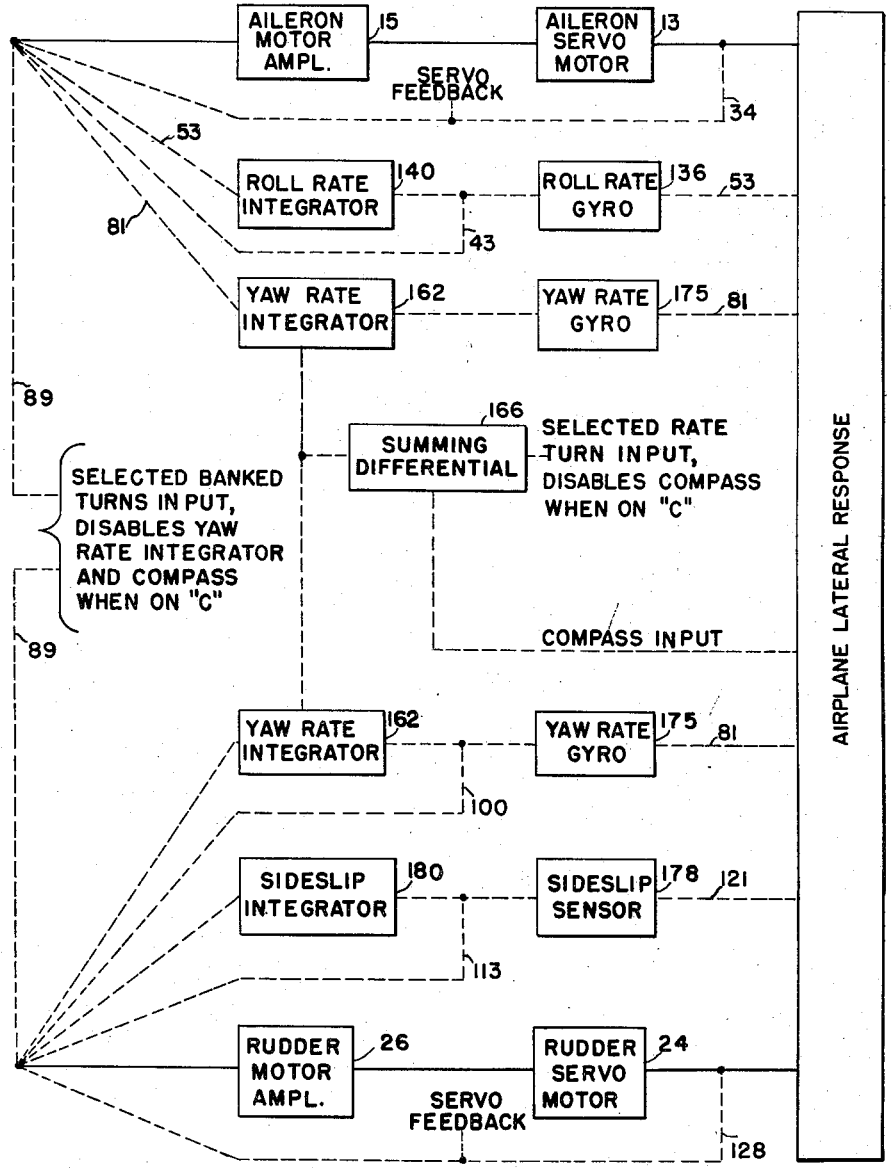

INVENTOR.
DAVID L. MARKUSEN

INVENTOR.
DAVID L. MARKUSEN
BY
George H. Fisher
ATTORNEY

United States Patent Office 2,877,967
Patented Mar. 17, 1959

2,877,967

AUTOMATIC STEERING MECHANISM FOR DIRIGIBLE CRAFT

David L. Markusen, Morningside, Minn., assignor to Minneapolis-Honeywell Regulator Company, Minneapolis, Minn., a corporation of Delaware Application April 20, 1953, Serial No. 349,835

15 Claims. (Cl. 244—77)

This invention pertains to automatic steering mechanisms for dirigible craft such as aircraft and in particular relates to such mechanisms for controlling the angular positions of the craft about its longitudinal and yaw axes.

Heretofore, apparatus including devices responsive to angular displacement of the craft about these axes have been utilized in said mechanism to stabilize the craft positions with reference to these axes. Additionally, manually operable selective devices have been provided in the apparatus to enable the positions of the craft to be altered about the axes with respect to the devices.

While the position of the craft could be regulated with respect to each axis, independently, alternatively, in some cases as during selected bank turns of the craft, its attitude about both axes will simultaneously be altered.

While angular displacement sensing devices provide an adequate standard from which to measure angular deviations of the craft, displacement signals alone are not sufficient to provide the desirable stabilization of the craft about its axes, and the angular displacement control has been supplemented by angular displacement rate devices, resulting in a complex mechanism.

Since displacement rate sensing devices are deemed necessary for satisfactory stabilization of the craft about its axes, for purposes of simplification of the steering mechanism, efforts were made to eliminate the angular displacement sensing devices.

It is an object of the present invention to eliminate the angular displacement device from a steering mechanism and provide improved means to obtain both angular displacement and angular displacement rate functions from the displacement rate sensing device to simplify the structure of the aircraft stabilizing mechanism.

It is a further object of this invention to effect through a steering mechanism for a dirigible craft selected rates of change in heading by opposing a manual selected control signal by a rate of change of craft heading signal directly in said mechanism and to additionally control said mechanism from an integration of the difference of the selected rate and craft heading rate signals.

It is a further object of this invention to effect selected rates of change in craft heading through a steering mechanism by controlling said mechanism from a differential of a selected rate of turn signal and an actual rate of turn signal and additionally control said mechanism from integration of the differential of the selected rate turn signal and the craft actual rate turn signal.

It is a further object of this invention to control the steering mechanism of a dirigible craft in accordance with the craft rate of turn and integration of craft rate of turn and to modify the integration control to correct for any drift of craft heading in accordance with heading changes of the craft detected by a magnetic compass while retaining the rate of turn control.

Figure 2:
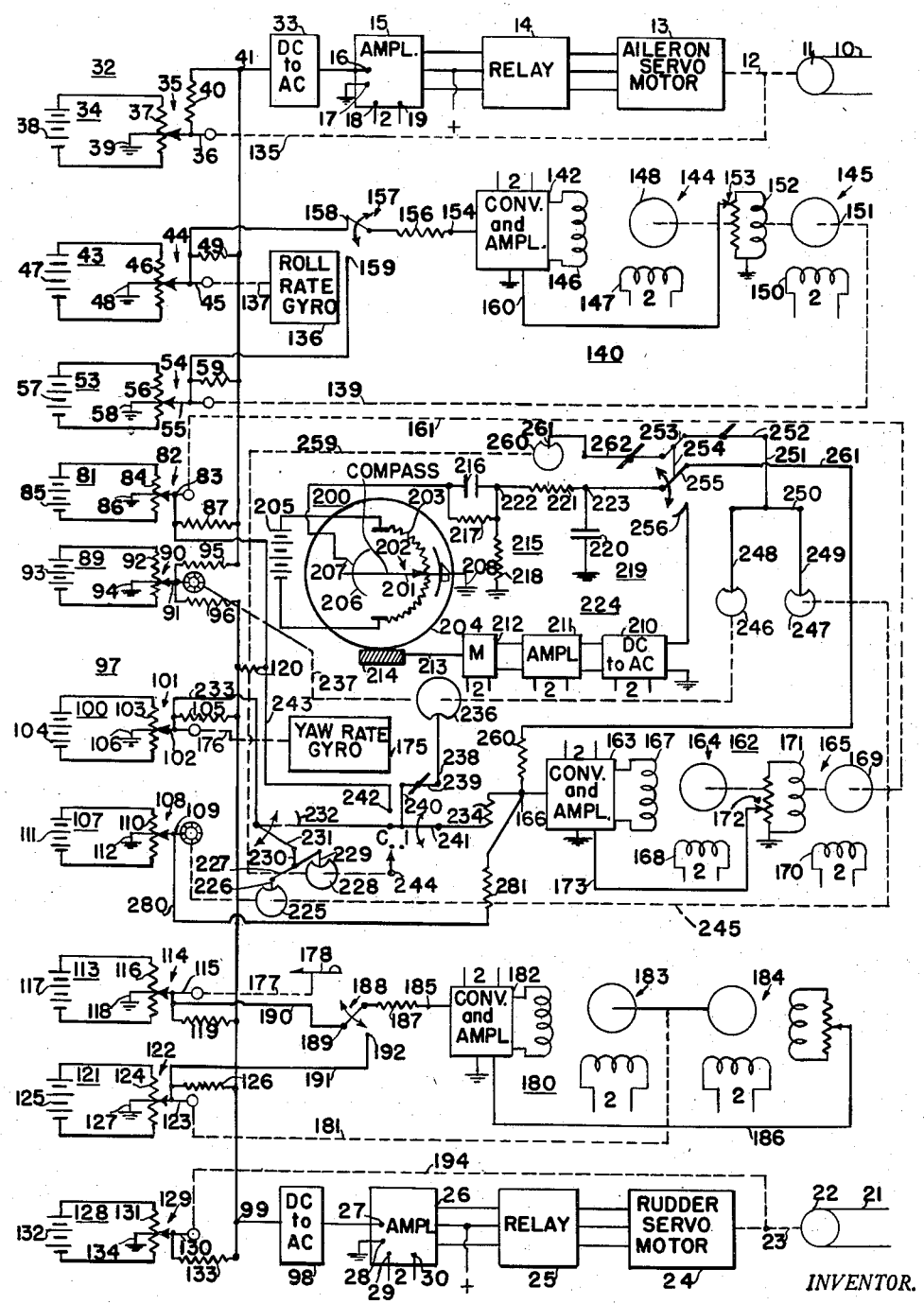

The above and other objects and advantages of the invention will become apparent upon the study of the following specification when considered in conjunction with the accompanying drawings in which Figure 1 is a block diagram of the apparatus embodying the principles of this invention and Figure 2 illustrates schematically one form of apparatus by which the objects of the invention are attained.

Referring to Figure 1, aileron surfaces (not shown) of the aircraft are operated by an aileron servomotor 13 which is reversibly controlled from an aileron servomotor amplifier 15. The rudder (not shown) on the aircraft is operated by a rudder servomotor 24 which is reversibly controlled from a rudder servomotor amplifier 26. Each amplifier is controlled by a balanceable network involving a servomotor position feedback so that the servomotor assumes a position proportional to two control signals, an initiating and follow-up signal, applied to the amplifier. Control signals for stabilizing an aircraft about its longitudinal axis are provided by a roll rate gyroscope 136 which directly applies its control effect to the aileron motor amplifier and also applies its control effect through a roll rate integrator 140 to the aileron motor amplifier. To eliminate side slip of the craft, a sideslip sensor 178 applies a twofold control effect on the rudder motor amplifier one being directly applied thereto and the second being applied through a sideslip integrator 180 to the rudder motor amplifier. Rudder operation is thereby obtained to eliminate craft yaw for craft tilt about its longitudinal axis.

Craft heading stabilization is provided by a yaw rate gyroscope 175 and yaw rate integrator. Since large craft heading deviations are corrected by banked turns of the craft, the aileron motor amplifier 15 is controlled by an integrated craft yaw rate control and the rudder motor amplifier is controlled by a craft yaw rate integrator control plus a direct yaw rate control. The operation of both the ailerons and rudder surfaces to correct heading deviations of the craft involve banked turns of the craft which may be termed the airplane's lateral response. If the banked turns are not coordinated by normal operation of the rudder, the sideslip sensor 178 effects a correction of the rudder position to coordinate the turns. During such banked turns of the craft, the roll rate gyroscope 136 through its direct effect and through its integrators also controls the lateral response of the craft.

Since the type of integrator utilized gives good integration of rate signals when the frequency at which the disturbances occur which result in the production of such rate signals are low this type of integrator does not give good integration where the frequency of such rate signals are high. Consequently, a drift in the integrator will occur which will cause craft to alter its normal attitude about either its yaw or longitudinal axis. Since change in longitudinal attitude would cause a bank of the craft and since a change in the bank attitude would cause a change in heading of the craft, a proper heading reference such as a magnetic compass may control a yaw rate gyroscope integrator with the integrator providing a signal which would cancel any drift in the roll rate integrator tending to change attitude about the longitudinal axis.

When selected rate turns are desired, the magnetic compass is rendered ineffective to control the yaw integrator which feeds both the aileron motor amplifier and the rudder motor amplifier but the selected manual signal is applied to both amplifier inputs through an integrator.

Additionally when selected banked turns are desired a manual input control is applied both to the aileron motor amplifier and to the rudder motor amplifier directly and the yaw rate integrator is rendered ineffective to control either amplifier. The compass is utilized to control a self balancing arrangement to null the output from the compass during such changes in heading at the selected bank angle.

Having considered the general nature of the apparatus for performing the invention, a detailed description of one embodiment thereof follows.

Referring to Figure 2, the aileron control surfaces (not shown) are connected to cables 10 extending from a cable drum 11 carried on an output shaft 12 of an aileron servomotor 13. The aileron servomotor is of the reversible D. C. energized type and is operatively controlled through an energized engage relay 14 from an aileron servomotor amplifier 15. The amplifier 15 may be of the phase discriminator type having control alternating voltage signal input connections 16, 17 and alternating voltage power input connections 18, 19. The amplifier conventionally includes a pair of relays which are alternatively energized depending upon the phase relationship of the alternating voltage input signal with respect to the alternating power supply voltage. Depending upon which amplifier relay is energized, the aileron servomotor operates in one or the other direction. The aileron amplifier-aileron servomotor combination may be similar to that disclosed in Patent 2,425,734 to Willis H. Gille et al. Similarly, the rudder surface (not shown) of the aircraft is operatively connected to cables 21 extending from a cable drum 22 carried by an output shaft 23 of a rudder servomotor 24. The rudder servomotor is reversibly controlled through an operated engage relay 25 from a rudder servomotor amplifier 26. The amplifier 26 is also of the phase discriminator type having alternating voltage control signal input connections 27, 28 and alternating voltage power input connections 29, 30. The rudder servomotor amplifier-rudder servomotor combination may be similar to the aileron servomotor amplifier-aileron servomotor combination.

Control signals for aileron amplifier 15 are obtained from a balanceable network 32. Since the network 32 supplies direct voltage control signals a D. C. to A. C. converter 33 is placed intermediate the network 32 and discriminator amplifier 15. The network 32 comprises a plurality of control signal voltage generators 34, 43, 53, 81 and 89. These signal generators are connected in a parallel summing arrangement to a summing point 41 leading into the converter 33. Signal generator 34 comprises a servomotor operated follow-up potentiometer 35 having a slider 36 and a resistor 37 which is connected across a source of voltage such as a battery 38. A summing resistor 40 connects slider 36 with summing point 41. The resistor has a grounded center tap connection 39. The signal generator 43 comprises a craft roll rate potentiometer 44 having a slider 45 and resistor 46 which is connected across a battery 47. The summing resistor 49 connects slider 45 to summing point 41, and the resistor 46 has a grounded center tap 48. Signal generator 53 supplies a signal proportional to the integral of craft roll rate and comprises a potentiometer 54 having a slider 55 and resistor 56 connected across a battery 57. The resistor 56 has a grounded center tap 58 and a summing resistor 59 connects slider 55 with summing point 41. Signal generator 81 provides a signal proportional to the integral of yaw rate or alternatively a signal proportional to the integral of yaw and comprises a potentiometer 82 having a slider 83 and resistor 84 which is connected across a battery 85. A summing resistor 87 connects slider 83 with summing point 41. Resistor 84 has its center tap connected to ground by a conductor 86. Signal generator 89 supplies a signal proportional to a manually selected banked turn and comprises a potentiometer 90 having a slider 91 and resistor 92 which is connected across a battery 93. A summing resistor 95 connects slider 91 with summing point 41 and a conductor 94 extends between a center tap of resistor 92 and ground.

Rudder amplifier 26 is controlled by signals provided by a balanceable direct voltage network 97. The direct voltage control signal from network 97 is supplied to a D. C. to A. C. converter 98 and thence to amplifier 26. Balanceable network 97 comprises the selected banked turn generator 89, a craft yaw rate signal generator 100, a craft sideslip signal generator 113, a signal generator 121 providing a signal proportional to the integral of craft sideslip, and a servomotor follow-up signal generator 128. The output terminal of network 97 is summing point 99 adjacent converter 98. Signal generator 89 previously described has a summing resistor 96 connecting slider 91 with network summing point 99. Yaw rate signal generator 100 comprises a potentiometer 101 having a slider 102 and resistor 103 which is connected across a battery 104. A summing resistor 105 connects slider 102 to summing point 99. A center tap of resistor 103 is connected to ground through conductor 106.

Signal generator 113 comprises a craft sideslip potentiometer 114 having a slider 115 and resistor 116 connected across a battery 117. A summing resistor 119 connects slider 115 to summing point 99, and resistor 116 is connected to ground through a conductor 118. Signal generator 121 has a sideslip integration potentiometer 122 having a slider 123 and resistor 124 connected across a battery 125. A summing resistor 126 connects slider 123 to summing point 99 and a conductor 127 connects a center tap of resistor 124 to ground. Signal generator 128 comprises a follow-up potentiometer 129 having a slider 130 and resistor 131 connected across a battery 132. A summing resistor 133 connects slider 130 to summing point 99 of the network, and a center tap of resistor 131 is connected to ground through conductor 134.

While the operating means for some of the potentiometer sliders in the two balanceable networks are straightforward, in some instances however the operating means is somewhat complex. Slider 36 of the follow-up signal generator 34 is connected to a follow-up connection 135 extending from the aileron servomotor output shaft 12 so that slider 36 is displaced relative to the center tap of resistor 37 in accordance with the displacement of aileron servomotor 13 from a normal position. Slider 45 of signal generator 43 is displaced along resistor 46 from its center tap in accordance with the rate of roll of the craft. The craft roll rate is sensed by a roll rate gyroscope 136 which has its response applied to slider 45 through a suitable operating means 137. Depending upon the direction of the rate of roll of the craft, slider 45 will be displaced to one or the other side of the center tap of resistor 46. Slider 55 is positioned along resistor 56 of signal generator 53 from an output shaft 139 of a motor driven integrator 140. The integrator comprises a combined D. C. to A. C. converter phase sensitive amplifier device 142, a capacitor type induction motor 144, and a velocity signal generator 145. D. C. control signals at a summing point 154 are converted to A. C. control signals by device 142, and the output of the amplifier section energizes one winding 146 of motor 144. The remaining motor winding 147 is connected to the alternating voltage supply. Depending upon the polarity of the D. C. control signal at summing point 154, the motor 144 rotates its rotor 148 in one direction or the opposite direction.

The rotor 148 of motor 144 drives the rotor 151 of the velocity signal generator 145. The generator 145 includes a primary winding 150 connected to the alternating voltage supply and a secondary winding 152 inductively coupled to winding 150 by the rotation of rotor 151. The voltage induced in winding 152 depends upon the speed of rotation of rotor 151. A voltage dividing potentiometer 153 has its resistor connected across the secondary winding 152 so that the desired velocity signal may be selected.

Motor 144 of integrator 140 rotates shaft 139 in accordance with the integral of craft roll rate. Craft roll rate signals are derived from signal generator 43 and are transmitted through the integrating position contact 158 of single pole double throw switch 157 and summing resistor 156 to the summing point 154. The roll rate signal applied to converter-amplifier 142 effect energization of motor 144 which operates the velocity signal generator 145. The output of the velocity signal generator 152 as modified by voltage dividing potentiometer 153 is fed back to device 142 and maintains the speed of motor 144 proportional to the magnitude of the signal from the roll rate generator 43. Slider 55 of the roll rate integration generator 53 will therefore be displaced at a rate proportional to the craft roll rate and will be displaced as long as generator 43 supplies a signal to device 142.

To reset the signal generator 53, the double throw switch has its contact arm moved into engagement with reset contact 159 when the output of the roll rate integrator generator 53 is applied to the converter-amplifier 142 which causes the operation of motor 144 whereby slider 55 is adjusted until it is adjacent the center tap of resistor 56 when no control signal from generator 53 is applied to device 142.

Reverting to the operating means for the sliders of the other generators, slider 83 of signal generator 81 is positioned along resistor 84 from an output shaft 161 of an integrator 162. The integrator 162 is similar to integrator 140 and comprises a D. C. to A. C. converter-phase sensitive amplifier device 163, a capacitor type induction motor 164, and a velocity signal generator 165. Control signals applied to the amplifier section of device 163 cause it to energize motor winding 167 in proportion to the input control signal. The other motor winding 168 is connected to the alternating voltage supply. The rotor of motor 164 rotates the rotor 169 of velocity signal generator 165 to inductively couple the primary winding 170 connected to the A. C. supply to the secondary winding 171 which is thereby energized in proportion to the velocity of rotation of rotor 169. The voltage from winding 171 as modified by a voltage dividing potentiometer 172 is supplied through conductor 173 into the output of the converter section of device 163 whereby the speed of motor 164 is made proportional to the input voltage on the amplifier section of device 163. Since several independent control signals may, depending upon the configuration selected, control operation of motor 164, the various selectable input control signals to device 163 will be subsequently considered.

Continuing with the generator actuators, the slider 91 of selected bank turn generator 89 is manually positioned along resistor 92 in either direction from the center tap of resistor 92. Slider 102 is positioned along resistor 103 of generator 100 in accordance with the angular rate of rotation of the craft about its yaw axis. The yaw rate of the craft is detected by a yaw rate gyroscope 175 of conventional type which transmits its response to craft rate of yaw to slider 102 by suitable operating connection 176. Slider 115 of generator 113 is positioned along resistor 116 in accordance with the sideslip angle of the craft by a suitable operating connection 177 extending therefrom to a vane 178 which is displaced in accordance with the angle between the longitudinal axis of the craft and the direction of air movement relative to the craft. The slider 123 of network 121 is positioned along resistor 124 by an operating shaft 181 of a sideslip angle integrator 180.

The integrator conventionally comprises a D. C. to A. C. converter-phase sensitive amplifier device 182, a capacitor type induction motor 183 and a velocity signal generator 184 driven by the motor. The output of the velocity signal generator 184 is fed back through conductor 186 to a control electrode of the amplifier section in device 182. Control signals to device 182 and applied to summing point 185 are supplied through summing resistor 187, integrating contact 189 of single pole double throw switch 188, conductor 190, to slider 115 of signal generator 113. Signals for resetting the signal generator 121 are supplied from slider 123 through conductor 191, reset contact 192 of the single pole double throw switch 188, through summing resistor 187 to summing point 185.

Slider 130 of the rebalance signal generator 128 is positioned along resistor 131 through a follow-up connection 194 extending between slider 130 and output shaft 23 of the rudder servomotor 24.

While integration of yaw rate signals is primarily relied upon to stabilize the craft heading, a magnetic compass device 200 is relied upon to correct for any inaccuracies or drift in the integrators. The compass device 200 may be of the magnetic type having a pivoted magnetic needle 201 serving as the slider of a potentiometer 202 with the potentiometer including a resistor 203 supported on a rotatable base member 204. The ends of the resistor 203 are connected across a battery 205 for energization. The opposite end of slider 201 rides on a collector ring 206. A brush 207 in contact with collector ring 206 and a ground conductor 208 extending from a brush which engages with a collector connected to a center tap of resistor 203 serve as the output members of the potentiometer. The potentiometer 202 has its output members 207, 208, connected across a rate taking circuit 215. The circuit 215 comprises a capacitor 216 and resistor 217 connected in parallel to slider 201 and in series with a resistor 218. The output of circuit 215 appears between junction point 222 of capacitor 216 and resistor 217 remote from slider 201 and the grounded end of resistor 218. An integration network 219 consisting of a resistor 221 and capacitor 220 connected in series extends between point 222 and ground. The output of the integration network 219 appears between the terminal 223 of resistor 221 and capacitor 220 and the ground terminal of capacitor 220.

When the compass device 200 is not being utilized to control integrator 162, the output of the compass potentiometer 202 is applied to a D. C. to A. C. converter 210 of a self-balancing arrangement 224. Arrangement 224 additionally includes a phase sensitive discriminator amplifier 211 which controls a capacitor type induction motor 212. The output shaft 213 of the motor operates a worm 214 engaged with the rotatable base 204 to thereby maintain the potentiometer 202 in a null condition.

While the roll rate integrator 140, during flight of the craft, is controlled from the roll rate signal generator 43, and the side slip integrator 180 is controlled from the sideslip angle signal generator 113, the integrator 162 is independently controlled from various sources of control signals depending upon the configuration selected by the pilot of the craft. The configuration for controlling integrator 162 depends upon the position of the operating means for slider 91 of the manual selected banked turn signal generator 89, the position of the operating means for slider 109 of the manual selected rate turn signal generator 107, and the position of a compass-integration selector knob 244. The operating means for slider 109 has its movement transmitted additionally to a plate cam 225 having a depressed portion normally engaged by a cam follower 226 which is pivoted to one end of a differential lever 227. Selector 244 when in the compass configuration position, as indicated by indicia adjacent the selector, has a cam 228 with a circumferentially indented portion engaged by a cam follower 229. The follower 229 is pivoted at the opposite end of differential lever 227. An intermediate point of the lever 227 is connected by an operating link 230 to a pivoted switch arm 231 which may be moved into engagement, by rotation of either cam, with a switch contact 232 of considerable circular extent to introduce the yaw rate signal to integrator 162. The circular dimension of contact 232 are such that arm 231 is in engagement with the contact by operation of either cam 225, 228 or by operation of both cams. Thus with the selector 244 moved from indicated compass position (C) to integration position (I), switch arm 231 engages contact 232 whereby slider 102 of yaw rate generator 100 is connected by conductor 233, arm 231, contact 232, summing resistor 234 to the summing point 166 for the converter-amplifier device 163 in integrator 162. Similarly on displacement of slider 109 from its center position on resistor 110, the cam 225 is concurrently rotated to displace switch arm 231 and effect its engagement with contact 232.

Resetting of integrator 162 is also provided; and for this purpose, the operating means for slider 91 of generator 89 has its movement transmitted by an operating connection 237 to a plate cam 236 having a circumferentially depressed portion normally engaged by a cam follower 238. The opposite end of the follower 238 is pivoted to a lever 239 having an intermediate pivot point. The opposite end of lever 239 is connected by an operating link 240 to a switch arm 241. Upon rotation of the cam 236, the arm 241 rotates clockwise and engages a reset contact 242 whereby control signals from integrator signal generator 81 through conductor 243 and summing resistor 234 are applied to the summing point 166. The control signals of integrator 81 as thus transmitted effect the movement of slider 83 to its null position on resistor 84.

The shaft 237 operated with slider 91 additionally supports a plate cam 246 and the shaft 245 operated with slider 109 additionally carries a plate cam 247. A peripheral indented portion of cam 246 is normally engaged by a cam follower 248 which at its opposite end is pivoted to a differential lever 250. Similarly, a peripheral indented portion of cam 247 is normally engaged by a cam follower 249 whose opposite end is connected to the opposite end of differential lever 250. An intermediate point of lever 250 is connected to one end of a lever 252 pivoted on the frame at an intermediate point by a link 251. The opposite end of lever 252 is connected to one end of a differential lever 253. From an intermediate point on lever 253, an operating link 254 extends to an operable switch arm 255 which rotates in a clockwise direction to engage a circularly extending contact 256. A conductor extends from contact 256 to the converter 210. Thus upon rotation in either direction of plate cam 246 or plate cam 247 the switch arm 255 is rotated clockwise to engage contact 256 to couple the output of network 219 associated with compass device 200 to the converter 210 of self-balancing arrangement 224 to maintain the compass potentiometer 202 in a null condition. The switch arm 255 may be additionally moved from the compass-integration selector 244. This operation is provided by the output shaft 259 of selector 244 carrying a plate cam 260 having a peripheral indented portion normally engaged by follower lever 261 which is connected to a lever 262 pivoted on the frame intermediate its ends. The opposite end of lever 262 is pivoted to the differential lever 253 whereby on rotation of knob 244 to the (I) position indicated the switch arm 255 is brought into engagement with contact 256 to maintain the compass potentiometer 202 in a null condition.

Having completed the detailed description of the apparatus, and considering its operation, if the craft heading is to be stabilized from an integrated yaw rate control signal, selector 244 is moved to the (I) position, switch 157 is operated to engage contact 158, switch 188 is operated to engage contact 189, and sliders 91 and 109 are moved to the centers of their respective resistors. Should the craft veer about its yaw axis, the angular movement is sensed by the yaw rate gyroscope 175 which operates potentiometer slider 102. The signal from the yaw rate generator 100 is applied directly into network 97 and is also applied through conductor 233, switch arm 231, contact 232, switch 241, summing resistor 234, to summing point 166 and thence to the converter-amplifier device 163. The control signal effects operation of the motor 164 of integrator 162 which operates velocity signal generator 165 so that the angular rate of motor 164 is proportional to the signal from yaw rate signal generator 100. The motor 164 of integrator 162 through its output shaft 161 positions slider 83 of the yaw integrator. The output of the yaw integrator signal generator 81 is applied through summing resistor 87 into the aileron amplifier network 32 and through summing resistor 129 is applied to the network 97 of rudder servomotor amplifier 26. The unbalance of the networks 32 and 97 result in the positioning of the aileron and rudder surfaces to cause the craft to bank and turn.

The roll rate gyroscope 136 senses the rate of change in bank attitude and operates slider 45 in the roll rate generator 43. The signal from the roll rate generator 43 is applied directly through summing resistor 49 to network 32 and is also applied through the single pole double throw switch 157 and summing resistor 156 to the converter-amplifier device 142. The integrator 140 through its output shaft 139 effects displacement of slider 55 of the roll rate integrator 53 whereby a signal is applied through summing resistor 59 to network 32. The signals from the roll rate generator 43 and the roll rate integrator generator 53 opposes in network 32 the signal from the yaw integrator generator 81 causing the movement of the aileron surfaces back to their normal position.

As the craft's heading, because of the banked attitude, returns toward its original direction, the rate of yaw of the craft is in the opposite direction from that during the initial veering of the craft whereby slider 102 is displaced to the opposite side of the center tap of resistor 103. This opposite signal from generator 100 effects reverse operation of the integrator 162 whereby slider 83 of the yaw integrator is moved toward the null position on resistor 84. Since the yaw integration signal decreases, the roll rate integration signal is in excess thereof in network 32 causing a reverse displacement from the normal position of the aileron surfaces resulting in a decrease in the banked attitude of the craft. The subsequent continuous operation of the ailerons results in the craft regaining its original heading with the control surfaces returned to normal.

Should it be desired to alter the heading of the craft at a selected rate, slider 109 is manually displaced relative to the center of resistor 110 a distance proportional to the rate of turn desired and in a direction from the center of resistor 110 depending upon the direction in which the turn is to be executed. The operation of the slider 109 will not disturb the connection of the yaw rate generator 100 with the converter-amplifier device 163. Neither, with the selector 244 in the (I) position, will operation of slider 109 alter the connection of the compass output potentiometer 202 and its network 219 to the D. C. to A. C. converter 210 whereby the compass output potentiometer is maintained in a null condition.

The rate of turn signal from generator 107 selected by adjustment of slider 109 is transmitted over conductor 280 from slider 109 through summing resistor 281 to summing point 166. The integrator 162 thereupon operates the slider 83 in the yaw integration generator 81 to apply signals in aileron servomotor amplifier network 32 and rudder amplifier network 97 to cause the craft to bank and turn. The yaw rate gyroscope 175 in response to the rate of turn of the craft operates slider 102 with respect to resistor 103. The output of the yaw rate generator 100 is applied directly to network 97 and is also applied over conductor 233 to summing point 166 and opposes the signal from the selected rate turn generator 107. When the rate of turn of the craft as detected by the yaw rate gyroscope operated generator 100 is equal to the selected rate from generator 107 the input signal of device 163 is reduced to zero and the integration motor 164 has its operation terminated with the signal of the yaw integration generator 81 being applied in both networks 32 and 97. It is evident that the integration device 162 will continue to increase the signal in the yaw integration generator 81 and thus increase displacement of the ailerons and rudder until the craft yaw rate signal and the selected rate turn signal are equal. Thus the craft must fly at the selected rate as determined by the positioning of slider 109. The rate of turn of the craft is terminated by moving slider 109 back to the center of resistor 110 when the integration device 162 will operate its output shaft 161 in the reverse direction to remove the yaw integration signal from generator 81 since the rate gyro operated signal generator output exceeds that from generator 107.

If banked turns of the craft are to be made at a selected bank angle, slider 91 is displaced relative to resistor 92 in a direction depending upon the direction of craft bank and a distance proportional to the magnitude of the bank angle selected. Operation of slider 91 will rotate cam 236 whereby the switch arm 241 is connected to reset contact 242 causing the yaw integration signal generator 81 to zero itself. The operation of cam 246 along with the operation of slider 91 does not disturb the connection of the compass potentiometer 202 through network 219 to the D. C. to A. C. converter 210 and the compass potentiometer is maintained in a null condition. The selected banked turn signal is applied directly to both networks 32 and 97 causing the operation of the ailerons and rudder surfaces of the craft. The craft banks under the selected banked turn signal until the roll rate integration signal from generator 53 balances the manual signal from generator 89. At such balance, the aileron and rudder surfaces have been moved toward normal position.

Should the banked turn of the aircraft be uncoordinated, the sideslip of the craft is detected by the vane 178 which applies a correction through the signal generator 113 directly and through the integration signal generator 121 to remove the sideslip of the craft by modifying the positioning of the rudder.

The bank angle of the craft, however, is not modified by operation of the vane and the selected bank angle is maintained. When the craft is to be restored to its level position, the slider 91 is restored to the center of resistor 92 whereby the roll integration signal from generator 53 causes a reverse unbalance of the network 32 causing the craft due to the opposite positioning of the ailerons to return to its level position. The rudder surface also is simultaneously moved to its normal position as the bank angle decreases.

In some instances, such as during high rate of craft heading disturbances, the integrators 140 and 162 may not function as to be considered perfect integrators. In other words, the integrators might not actually provide an operation of their respective integration signal generators proportional to the rate signals applied to them. Thus there may be a residual signal in the roll rate integration signal generator 53 tending to change the lateral attitude of the craft to cause it to bank and change heading. Such change in craft heading due to the bank of the craft would be detected by the yaw rate gyroscope 175 which would have its response integrated in the yaw integration signal generator 81 tending to compensate for the drift in the roll rate integrator signal generator 53. However, if selected banked turns from generator 89 be made and with the compensating residual signal above due to drift remaining in the roll rate integration signal generator 53, it is evident that upon movement of slider 91 that the yaw integration signal generator 81 through its reset contact 242 is moved to its null position. Upon completion of the manual selected banked turn, and with slider 91 restored to its normal position, the residual integrated roll rate signal due to drift is not immediately compensated for by the yaw integration signal generator 81. A permanent change in craft heading would therefore result. To overcome this tendency to change heading permanently upon restoring the slider 91 to its original position, the selector 244 may be placed in the (C) position indicated as slider 91 is restored to its null position on resistor 92. Should the residual signal in the roll rate integrator signal generator 53 tend to change craft heading, a change in heading is detected by the compass 200 and the signal therefrom is applied from the output point 223 of network 219, closed switch 255, conductor 261, summing resistor 260, to the summing point 166. The signal at summing point 166 effects operation of the integrator 162 which operates the yaw integration signal generator 81 to prevent change in heading of the craft from that existing when slider 91 was restored to its null position.

If either integrator is suspected of incurring a drift whereby a residual signal remains therein, the engage relays 14, 25 may be open circuited to disconnect the control surfaces from their respective servomotors. The control surfaces may now be operated manually. During manual operation of the surfaces, switch 157 may engage contact 159 to zeroize the roll rate integrator 53, and the operating knob for slider 91 may be displaced for a short time whereby switch arm 241 is operated completing a circuit to zeroize integrator 162. Switch 157 may be thereafter brought into engagement with contact 158 and slider 91 restored to normal position when switch arm 241 connects point 166 with rate signal generator 100 to resume automatic control from the roll rate integrator and the yaw rate integrator.

It will now be apparent that there has been provided a novel automatic steering mechanism for a dirigible craft wherein devices responsive to the angular displacement rate of the craft are utilized to maintain the craft at predetermined attitudes in respect to its axes and that novel means have been included therein for effecting alternatively manual selected turns of the craft at predetermined rates or selected turns at predetermined bank angles and that supervisory angular displacement sensing devices may be incorporated in the steering mechanism to compensate for the drift of rate operated devices because of errors therein due to the limitations of the frequency response of the rate devices to the control impulses supplied thereto. While various modifications of the arrangement may suggest themselves, it is to be understood that the invention is not restricted to the particular embodiment disclosed but as qualified by the subjoined claims.

I claim as my invention:

1. Control apparatus for a dirigible craft having a control surface for controlling the heading of said craft, said apparatus comprising: selective means providing a first voltage proportional in magnitude to its extent of adjustment; a motor means having an input connected to the selective means and producing an output voltage proportional to a time integral of said first voltage; power means coupled to said motor means and controlled by said output voltage for operating said control surface; follow-up means in said power means operated by said power means to proportion the extent of operation of said power means to the output voltage of the motor means; and means responsive to the rate of heading change of the craft and connected to the motor means input for modifying the operation of said motor means, to effect a change in heading at a selected rate.

2. Control apparatus for a dirigible craft having a control surface, comprising: a first motor means for operating said surface to control craft heading; a balanceable control means for operating said motor means on unbalance thereof; a magnetic compass responsive to the magnetic field of the earth; a craft heading signal voltage generator operated by said compass in proportion to change in craft heading from a predetermined direction; means connected to said signal voltage generator and supplying an output voltage proportional to said heading change and the rate of heading change; a second motor means operated by said output voltage; an integrating voltage source in said control means operated by said second motor means; a follow-up voltage source in said control means positioned by said first motor means; and connections from said control means to said first motor means for controlling said first motor means from said integrating and follow-up voltage sources.

3. Control apparatus for a dirigible craft having aileron control surfaces for controlling craft roll attitude during changes of the craft heading, said apparatus comprising: a magnetic compass means controlled by the magnetic field of the earth and responsive to craft heading deviations from a predetermined direction and deriving a compass signal; a motor; connecting means for controlling the speed of said motor from said compass means in accordance with the heading deviation; a signal generator operated by said motor and developing an output signal proportional to said motor operation speed and operation duration; power means for operating said aileron surfaces and controlled from said motor operated signal generator; and further means for developing a selected bank signal and controlling said power means, said further means also including means for orienting said compass means to remove said compass signal during the selected bank turn.

4. Control apparatus for a dirigible craft having a control surface for controlling its heading, said apparatus comprising: power means for operating said surface; a balanceable signal providing network for controlling said power means on unbalance thereof; a craft heading rate responsive device; integrating means comprising a signal generator connected in said network and controlled by said heading rate device, for maintaining a selected craft heading; manually operable means for changing craft heading at a selected rate; and means for connecting said manually operable signal means in opposition to said rate device for additionally controlling said integrating means from said manual means, said integrating means terminating operation when the response of the heading rate device is in accordance with the operation of the manual means, whereby the craft changes heading at the manually selected rate.

5. Control apparatus for a dirigible craft comprising: power means for controlling the steering of said craft; a magnetic compass for detecting changes in craft heading from a selected direction and subject to normal oscillations due to inertia; signal means including a resistor and capacitor in parallel and both in series with a resistor and operated by said compass for deriving a heading and heading rate signal; filtering means comprising a resistor and capacitor in series and controlled by high frequency compass derived heading and heading rate signals due to its normal oscillations and thus filtering spurious changes in heading and heading change rate to obtain low frequency heading change and heading rate signals in accordance with the heading deviation of said craft from the selected direction; and means for controlling said power means from said signals to correct the path of flight of said craft to return the craft to the selected direction.

6. Control apparatus for an aircraft having aileron and rudder control surfaces for controlling craft heading through banked turns, said apparatus comprising: a first power means for operating said ailerons: a second power means for operating said rudder; craft heading deviation responsive means sensing departure of craft heading from a meridian of the earth for deriving a control signal proportional to craft heading change from a desired direction; means connected to the heading responsive means for integrating with respect to time said heading change signal, means comprising two balanceable networks each individually controlling operation of one of said power means and connected to said integrated signal providing means; and follow-up signal means driven by each power means and connected to its said network controlling means for proportioning operation of the power means in accordance with said integrated signal.

7. The apparatus of claim 6, including means for additionally controlling the integrating means by a component signal proportional to the rate of change of said heading change signal.

8. Control apparatus for a dirigible craft having a control surface for controlling craft attitude about one of its axes, said apparatus comprising: power means for operating said control surface; a rate of attitude change responsive device providing a signal proportional in magnitude to craft attitude change rate; motor operated integrating means responsive to said rate signal and providing an output signal proportional to the time integral of said rate signal; means operated by said integrated output signal for controlling said power means; attitude means responsive to the craft attitude change about a second axis and deriving a third control signal varying in magnitude to said change; and means operating said power means to alter craft attitude about said one axis from said third signal for correcting said integrating means operation by said rate responsive device from said attitude responsive device control signal to stabilize the craft about said axis.

9. Control apparatus for an aircraft having rudder and aileron control surfaces for controlling craft attitudes about the roll and yaw axes thereof, said apparatus comprising: power means for operating said rudder; power means for operating said ailerons; a magnetic compass means responsive to heading changes from a desired direction and providing a signal proportional to craft heading change; means connected to said compass means for integrating said heading signal with respect to time; control means responsive to said integrating means for operating said rudder power means; follow-up means in said control means driven by said rudder power means to stabilize craft heading, means responsive to the rate of roll of the craft and providing a signal proportional to roll rate; means for integrating the signal proportional to roll rate, control means responsive to said integrated roll rate signal and operating said aileron power means to stabilize the craft attitude about the roll axis, all whereby if any residual bank of said craft, resulting from operation of said ailerons due to improper functioning or inaccuracies of said roll rate integrator, tends to change craft heading from said desired direction, such tendency is corrected by said heading signal integrator.

10. The apparatus of claim 9, including signal deriving means responsive to side slip of said craft; means for integrating said side slip signal; and means for modifying the operation of said rudder power means from said integrated side slip signal.

11. Control apparatus for an aircraft having a control surface for controlling the heading of said craft, said apparatus comprising: power means including a first balanceable signal network for positioning said surface, said network including a first signal generator responsive to the rate of change of heading of said craft, a second signal generator driven by an integrating motor, and a follow-up third signal generator positioned by said power means; a second balanceable network for controlling said integrating motor; a fourth signal generator in said second network manually adjusted in accordance with a selected rate of change of heading; means for additionally connecting said first signal generator in said second network; and a velocity signal generator in said second network for controlling the speed of said integrating motor in accordance with the difference of said first and fourth signals.

12. In control apparatus for an aircraft having a first motor means adapted to control craft position about its yaw axis and a second motor means adapted to control craft roll attitude, in combination: a roll rate gyroscope, a motor operated integrator connected to the gyroscope and providing an output control signal proportional to the integration of the craft roll rate, control means connected to said integrator and operated thereby and also connected to the second motor means for control thereof whereby craft roll attitude is stabilized for low frequencies of craft roll attitude disturbances, a craft heading deviation sensing device, a second motor operated integrator connected to said heading deviation sensing device and providing a signal proportional to the integral of heading deviation, control means connected to the first motor means, further means connecting said second integrator with both first and second motor control means for stabilizing the craft heading, all whereby for higher frequencies of roll attitude disturbance resulting in incomplete roll rate integration due to inertia of said motor operated integrator and thus change in roll attitude from the attitude to be stabilized and thus cause change in craft heading from said roll attitude change, said second integrator operates said second motor means to restore the craft to its original roll attitude.

13. Control apparatus for a dirigible craft comprising: power means for controlling the steering of said craft; craft heading change responsive signal deriving means; signal integrating means controlled by said heading responsive means signal and having an output signal which is a time integration of the heading change signal; means operated by said integrating means output signal and controlling said power means for maintaining craft heading against permanent disturbances tending to change craft heading; a heading rate responsive signal deriving device; means for alternatively controlling said integrating means from said heading rate responsive signal deriving device to maintain craft heading during nonuse of the heading change responsive means; manually operable means for controlling said power means to change heading; and means controlled by said manually operable means to effect control of the integrating means from the output signal for resetting said integrating means to zeroize the output signal and for altering the relation of said heading change responsive means and said craft.

14. Control apparatus for an airplane having roll attitude changing means, said apparatus comprising: means responsive to the rate of change of attitude of the airplane from a selected roll attitude; an integrating means controlled thereby to provide an output substantially proportional to the roll attitude change of the airplane; control means responsive to said integrating means and operating said roll attitude changing means, to stabilize the roll attitude of the airplane; an airplane heading deviation responsive device; a second integrating means controlled by said heading responsive device; and further means interconnecting said second integrating means and control means, whereby a change in heading ordinarily resulting from residual departure of craft roll attitude from selected roll attitude due to incomplete integration of the rate of change of roll attitude is opposed by the heading deviation responsive device.

15. Control apparatus for a dirigible craft having a rudder for controlling the craft attitude about its yaw axis, said apparatus comprising: a servomotor means for operating said rudder; a balanceable network connected to said motor means and having a plurality of controllers and causing operation of said motor means on unbalance of said network by operation of a controller; manual selective craft rate turn means for providing a control signal of variable magnitude proportional to a desired rate of craft turn; an integrator including a second motor means controlled from said selective means and operating at a rate proportional to the selected control signal magnitude; coupling means for operating a controller in said network from said second motor means and deriving a second control signal proportional to the time integral of said rate of operation of said second motor means to increase craft rate of turn with increase of said second signal; additional means connected to the second motor means for control of said motor means and having a response varying with the craft rate of turn for developing an effect opposing the control of said second motor means from said manual selective rate turn means to terminate operation of the second motor means and to limit the second control signal; and further means connected to said additional means and thus responsive to craft rate of turn for applying directly into said network a third control signal proportional to the actual craft rate of turn to stabilize the craft rate of turn at the selected value.

References Cited in the file of this patent
UNITED STATES PATENTS

| | | |
|---|---|---|
| 2,221,748 | Alkan | Nov. 19, 1940 |
| 2,553,597 | Maroni | May 22, 1951 |
| 2,617,615 | Von Eschen | Nov. 11, 1952 |
| 2,632,142 | Chenery | Mar. 17, 1953 |
| 2,638,288 | Hanna | May 12, 1953 |
| 2,662,207 | Hollister | Dec. 8, 1953 |
| 2,679,366 | Noxon | May 25, 1954 |